(12) United States Patent
Choquette et al.

(10) Patent No.: US 7,689,782 B1
(45) Date of Patent: Mar. 30, 2010

(54) PROCESSOR INSTRUCTION USED TO DETERMINE WHETHER TO PERFORM A MEMORY-RELATED TRAP

(75) Inventors: Jack Choquette, Mountain View, CA (US); Gil Tene, Los Altos Hills, CA (US); Michael A. Wolf, San Francisco, CA (US)

(73) Assignee: Azul Systems, Inc., Mountain View, CA (US)

( * ) Notice: Subject to any disclaimer, the term of this patent is extended or adjusted under 35 U.S.C. 154(b) by 0 days.

(21) Appl. No.: 11/296,195

(22) Filed: Dec. 6, 2005

Related U.S. Application Data (63) Continuation-in-part of application No. 10/701,388, filed on Nov. 4, 2003, now Pat. No. 7,117,318, and a continuation-in-part of application No. 11/031,015, filed on Jan. 7, 2005, now Pat. No. 7,469,324.

(60) Provisional application No. 60/492,585, filed on Aug. 4, 2003.

(51) Int. Cl.
*G06F 13/00* (2006.01)

(52) U.S. Cl. .................. 711/152; 711/153; 711/173; 707/206; 712/244

(58) Field of Classification Search .......... 711/206, 711/152, 153, 173; 707/206; 712/225, 244
See application file for complete search history.

(56) References Cited

U.S. PATENT DOCUMENTS

| | | | | |
|---|---|---|---|---|
| 5,088,036 A | * | 2/1992 | Ellis et al. | 707/206 |
| 5,317,717 A | * | 5/1994 | Cutler et al. | 711/163 |
| 5,765,206 A | * | 6/1998 | Hohensee et al. | 711/203 |
| 5,842,225 A | * | 11/1998 | Kohn | 711/202 |
| 6,098,089 A | * | 8/2000 | O'Connor et al. | 718/104 |
| 6,240,506 B1 | * | 5/2001 | Miller | 712/213 |
| 6,505,344 B1 | * | 1/2003 | Blais et al. | 717/151 |
| 6,622,226 B1 | * | 9/2003 | Dussud | 711/159 |
| 6,633,963 B1 | * | 10/2003 | Ellison et al. | 711/163 |
| 6,665,793 B1 | * | 12/2003 | Zahir et al. | 712/228 |
| 6,938,138 B2 | * | 8/2005 | Beukema et al. | 711/163 |
| 2001/0000821 A1 | * | 5/2001 | Kolodner et al. | 711/170 |
| 2004/0078547 A1 | * | 4/2004 | David et al. | 712/1 |
| 2005/0080980 A1 | * | 4/2005 | Wu et al. | 711/1 |
| 2005/0086658 A1 | * | 4/2005 | Wilding et al. | 718/104 |
| 2007/0266214 A1 | * | 11/2007 | Ohyama | 711/163 |
| 2008/0281885 A1 | * | 11/2008 | Dussud | 707/206 |

* cited by examiner

*Primary Examiner*—Eddie P Chan
*Assistant Examiner*—Keith Vicary
(74) *Attorney, Agent, or Firm*—Van Pelt, Yi & James LLP (57) ABSTRACT

An instruction used by a processor in a determination of whether to perform a trap is disclosed. The instruction includes a first set of one or more bits identifying the instruction, and a second set of one or more bits associated with a first address value used in the determination. The determination does not include performing a memory access that uses the first address value to determine a memory location of the memory access. The determination is based at least in part on more than one of the following: a group of one or more marker bits included in the first address value, a matrix entry located at least in part using one or more bits of the first address value, a Translation Look-aside Buffer entry associated with the first address value, whether the first address value is associated with stack allocated memory, and whether the first address value includes a null value.

30 Claims, 6 Drawing Sheets

PROCESSOR INSTRUCTION USED TO DETERMINE WHETHER TO PERFORM A MEMORY-RELATED TRAP

CROSS REFERENCE TO OTHER APPLICATIONS

This application is a continuation in part of U.S. patent application Ser. No. 10/701,388 entitled MEMORY MANAGEMENT filed Nov. 4, 2003 now U.S. Pat. No. 7,117,318, which is incorporated herein by reference for all purposes; which claims priority to U.S. Provisional Patent Application No. 60/492,585 entitled STACK BASED ALLOCATION filed Aug. 4, 2003, which is incorporated herein by reference for all purposes; and U.S. patent application Ser. No. 11/031,015 entitled SYSTEM AND METHOD FOR CONCURRENT COMPACTING SELF PACING GARBAGE COLLECTION USING LOADED VALUE AND ACCESS BARRIERS filed Jan. 7, 2005 now U.S. Pat. No. 7,469,324, which is incorporated herein by reference for all purposes.

BACKGROUND OF THE INVENTION

Processing references (e.g. memory address pointers) associated with a computer program object, in some cases, requires maintaining data associated with the references. The data associated with the references is stored in a software data structure associated with the references. For example, pointers to objects of a garbage collected programming language are associated with software data structures to mark objects as traversed during garbage collection. When accessing the references, computer code associated with the data structures are used to maintain the data structures. Since the references can be accessed frequently, it is desirable to minimize the performance penalty associated with the computer code. In minimizing the computer code, the computer code may become non-optimal, pessimistic, or complex. Therefore, there exists a need for an improvement in maintaining and handling data associated with references.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A processor instruction is disclosed. In some embodiments, one or more tests are performed using at least one object reference to determine if a trap operation should be performed.

Figure 1:
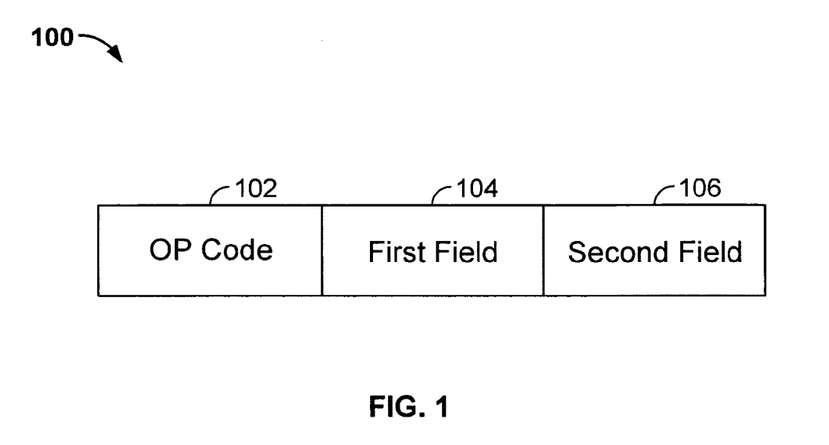
FIG. 1 is a diagram illustrating an embodiment of a computer processor instruction.

FIG. 1 is a diagram illustrating an embodiment of a computer processor instruction. Instruction 100 includes opcode 102, first instruction field 104, and second instruction field 106. A computer processor uses opcode 102 to determine one or more operations associated with the instruction. In some embodiments, field 102 and/or field 104 includes an instruction operand. Field 104 and 106 includes one or more bits that represent a value or an identifier associated with a value used in an operation of the instruction. For example, field 104 and/or field 106 includes bit(s) that represent a value to be directly used in an operation of the instruction, memory address associated with a value to be used in an operation, or an identifier of a register containing a value to be used in an operation. The value may include a location identifier of an object. The example shown includes two fields, yet in other embodiments, instruction 100 may include one or more than two fields. In some embodiments, at least one field of instruction 100 is used to specify a configuration associated with the instruction. Examples of configurations include instruction format specification, format of an instruction field, and configuration associated with an operation of the instruction.

In various embodiments when instruction 100 is executed, one or more tests are performed using at least one of the fields to determine if a trap should be performed. In some embodiments, performing the trap includes modifying a computer processor PC (Program Counter) of a computer processor. The types and/or the number of tests to be performed may be preconfigured by the opcode, one or more configuration bits in the instruction, and/or a configuration data associated with the instruction. In some embodiments, the types and/or the number of tests to be performed is dynamically determined. For example, a test is configured and/or performed depending upon a dynamically updated data. In some embodiments, if the trap is not performed, an access associated with at least one instruction field is performed. The access includes a read and/or a write operation. In some embodiments, the instruction is associated with a read barrier and/or a write barrier. The read barrier monitors read accesses and the write barrier monitors write accesses.

Figure 2:
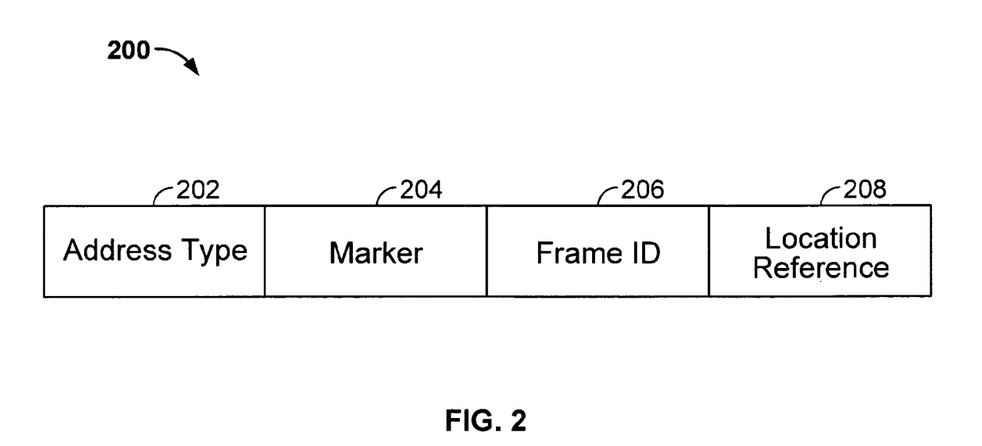
FIG. 2 is a diagram illustrating an embodiment of an address associated with an object.

FIG. 2 is a diagram illustrating an embodiment of an address associated with an object. In some embodiments, address 200 is associated with at least one field of instruction 100 of FIG. 1. In various embodiments, by using a processor instruction that includes address 200, maintaining and handling data associated with references are more efficient than compared to prior ways of maintaining and handling the data. Address 200 includes address type 202, marker 204, frame ID 206, and location reference 208. In some embodiments, address type 202, marker 204, and/or frame ID 206 is optionally included in address 200. In some embodiments, address 200 may include additional fields. Address type 202 includes one or more bits specifying the address type and/or the portions contained in address 200. Examples of address type include stack address type, or a raw pointer address type, or a heap address type, or a new heap address type, or an old heap address type. For example, one address type is associated with a heap allocated memory address and another address type is associated with a stack allocated memory address. In some embodiments, an address not associated with the stack address type does not include frame ID 206. Marker 204 includes one or more bits used to indicate if the address 200 has been processed, flagged, or marked through by a process. The process, in some embodiments, is a garbage collection process. For example, marker 204 is set to indicate if a garbage collector has traversed address 200 and/or determined as live or dead the object associated with the address. Frame ID 206 includes one or more bits indicating a stack frame associated with address 200. The value of the frame ID is a function of the object's frame depth in some embodiments. For example, in an embodiment where functions of a program are associated with frame depth, a program with 5 nested calls results in a frame ID of 5 for addresses associated with the newest stack frame. Location reference 208 includes one or more bits identifying a memory location of the object associated with address 100. Examples of location reference include a heap memory address location or a stack memory address location. In some embodiments, the location reference 208 may contain a different number of relevant bits depending on the address type 202. In some embodiments, the location reference 208 may be interpreted differently depending on address type 202. For example when address type 202 indicates a stack address type, location reference 208 may be added to a dynamically configured base address to determine the location being referred to.

Figure 3:
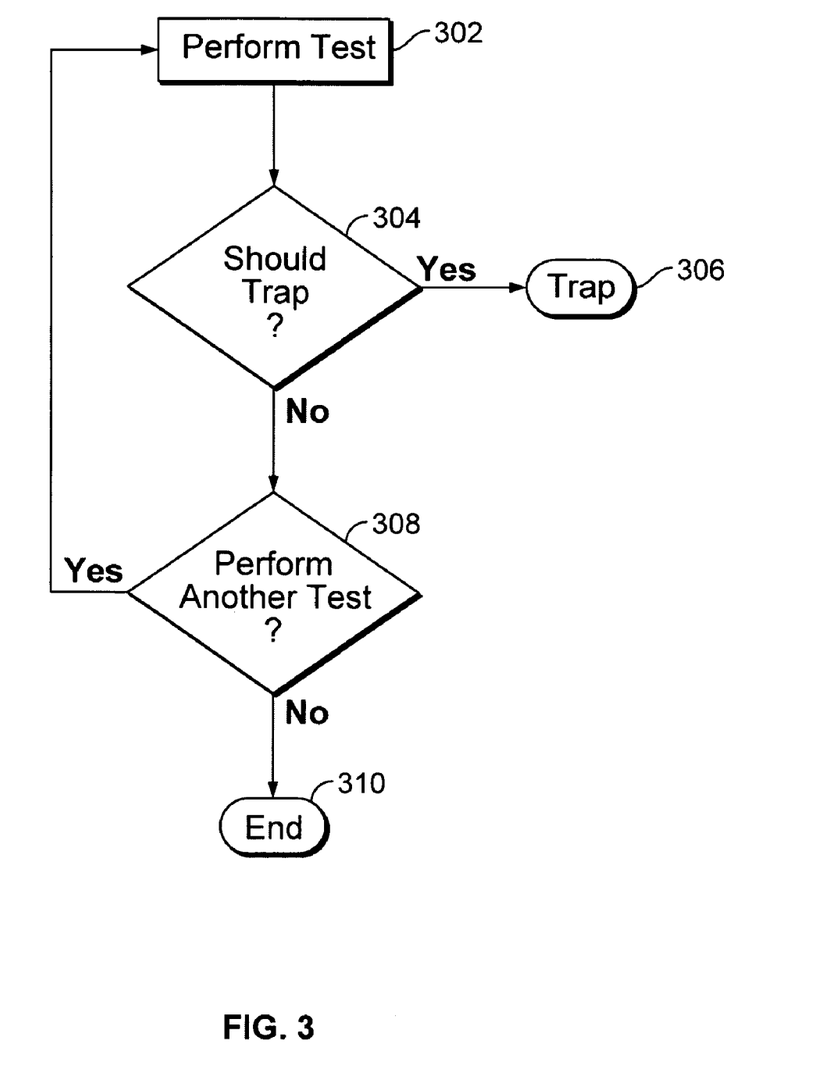
FIG. 3 is a flow chart illustrating an embodiment of a process for determining a trap.

FIG. 3 is a flow chart illustrating an embodiment of a process for determining a trap. In some embodiments, the process of FIG. 3 is at least a portion of processing operation associated with instruction 100 of FIG. 1. At 302, a test is performed. The test includes determining if a trap should be performed. At 304, if it is determined the trap should be performed, at 306 a trap determination is made. The determination of 304 is associated with the test of 302. In some embodiments, the trap determination of 306 includes redirecting execution of a program. Example of the redirection is a modification of the PC (Program Counter). In some embodiments, a trap handler is associated with the execution redirection. In some embodiments, different trap conditions result in different trap handlers being executed. The trap handler may process and/or log the trap as required to continue execution of a program. If at 304 it is determined the trap should not be performed, at 308, determination of whether to perform another test is made. If at 308 it is determined that another test should be performed, at 302, another test is performed. The test is a previously performed test or a new test that has not been performed. In some embodiments, multiple tests may be performed at the same time. Test performed at 302 may include one or more of the following tests: marker test, matrix test, frame test, and TLB test. The tests are further described later in the specification. The determination of whether to perform another test and the selection of the type of test to perform may be configurable, predetermined, and/or dynamically configured. For example, the determination of whether to perform another test and the selection of the type of test to perform is predetermined by an opcode of an associated processor instruction and/or configured by configuration data related to an associated instruction. Examples of the configuration data include one or more of the following: an indication of a user level processing, one or more configuration bits of an instruction, a system configuration data, a processor configuration data, a program configuration data, and a dynamically updated data. If at 308 it is determined that another test should not be performed, at 310 the process ends. In some embodiments, 310 includes performing a data access operation. In some embodiments, the access operation includes read and/or a write operation. For example, when instruction 100 of FIG. 1 is associated with the process of FIG. 3, one or more tests are performed, and a value associated with one of the fields of the instruction is stored into an address associated with the other field. In another example, one or more tests are performed, and data at an address associated with one of the fields of the instruction is read.

Figure 4:
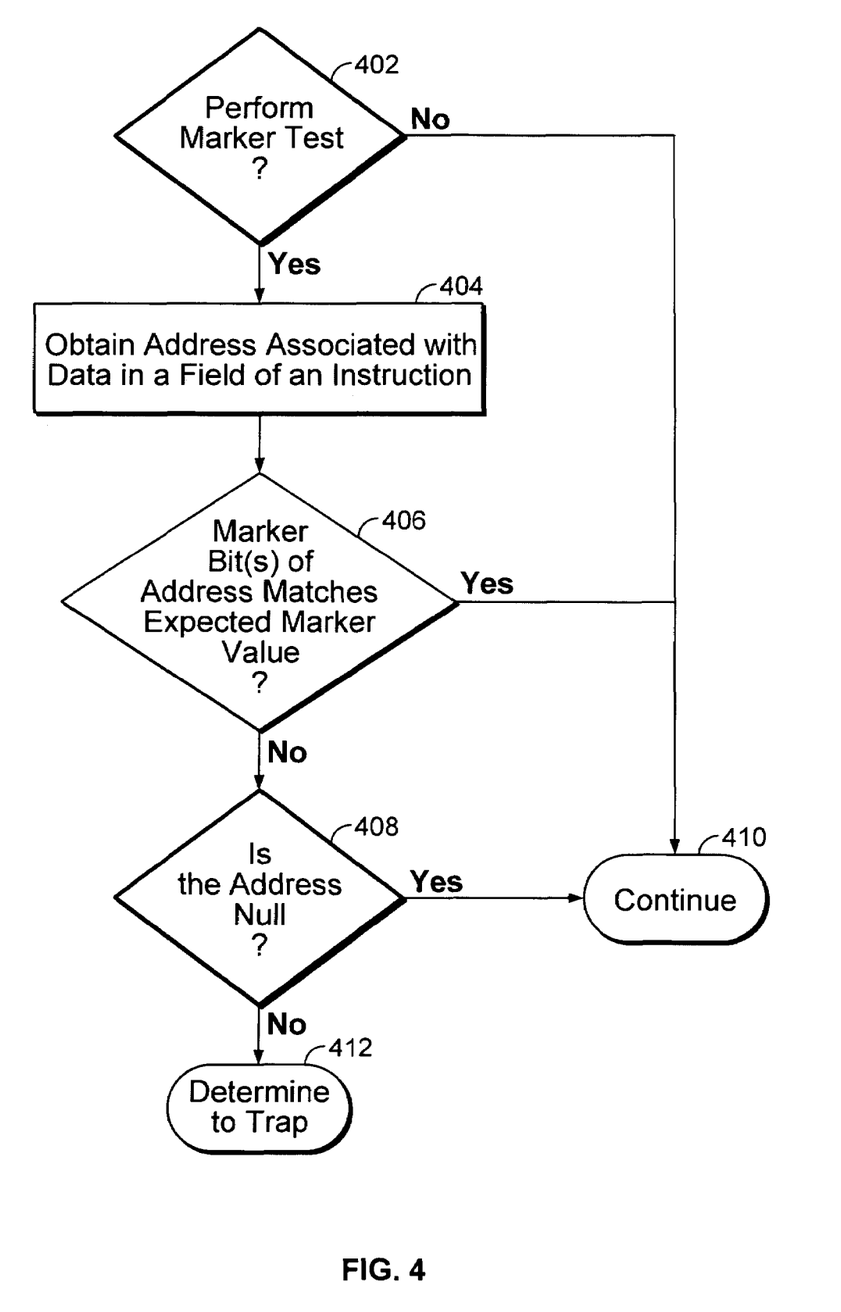
FIG. 4 is a flow chart illustrating an embodiment of a processor for performing a marker test.

FIG. 4 is a flow chart illustrating an embodiment of a processor for performing a marker test. In some embodiments, the process of FIG. 4 is included in 302 of FIG. 3. In some embodiments, the process of FIG. 4 is performed when executing instruction 100 of FIG. 1. At 402, it is determined whether the marker test should be performed. The determination of 402 is configurable, predetermined, and/or dynamically configured. For example, the determination is predetermined by an opcode of an associated processor instruction and/or configured by data related to an associated instruction. Examples of the configuration data include one or more of the following: an indication of a user level processing, one or more configuration bits of an instruction, a system configuration data, a processor configuration data, a program configuration data, and a dynamically updated data. At 402, if it is determined to not perform the marker test, at 410, continue determination is reached. In some embodiments, continue determination of 410 is associated with determining not to trap at 304 of FIG. 3. In some embodiments, continue determination of 410 is associated with the end of the marker test in the example of FIG. 4 and, if applicable, continuation or beginning of another process. If at 402 it is determined to perform the marker test, at 404, an address associated with data in a field of an instruction is obtained. In some embodiments the field is a field of instruction 100. The obtained address, in various embodiments, is in a format associated with address 200 of FIG. 2. At 406, if marker portion of the obtained address matches an expected marker value, at 410, continue determination is reached. The expected marker value is predetermined and/or configurable. In some embodiments, the expected marker value is dependent upon the obtained address, the instruction field, instruction, and/or a configuration data. For example, in some embodiments, there may be different expected marker values for different values of the address type portion in the obtained address. In some embodiments, the marker portion of the address is used to indicate if the location reference associated with the address has been traversed or queued for processing. In concurrent garbage collection, where a garbage collector and a mutator are allowed to execute simultaneously, it may be desirable to trap any loads of addresses that have not been traversed by a garbage collector trying to identify live and dead objects. A marker value may be used to identify addresses that have been traversed by a garbage collector in a collection cycle, or are known to already be pending traversal in a collection cycle. If at 406 the marker portion of the obtained address does not match the expected marker value, at 408, a null check is performed. At 408, if the obtained address is null, at 410, continue determination is reached. In some embodiments a null address is an address including a zero value portion or consisting of only zero value bits. For example, in some embodiments, an address with an address type portion containing a zero value may be considered a null address in this null check. At 408, if the obtained address is not null, at 412 trap determination is reached. In various embodiments, the null check is performed before 406. The null check, in some embodiments, is optional and/or not performed. In some embodiments, the trap of 412 is associated with 304 of FIG. 3. In various embodiments, the trap of 412 is associated with one or more trap handing processes.

Figure 5:
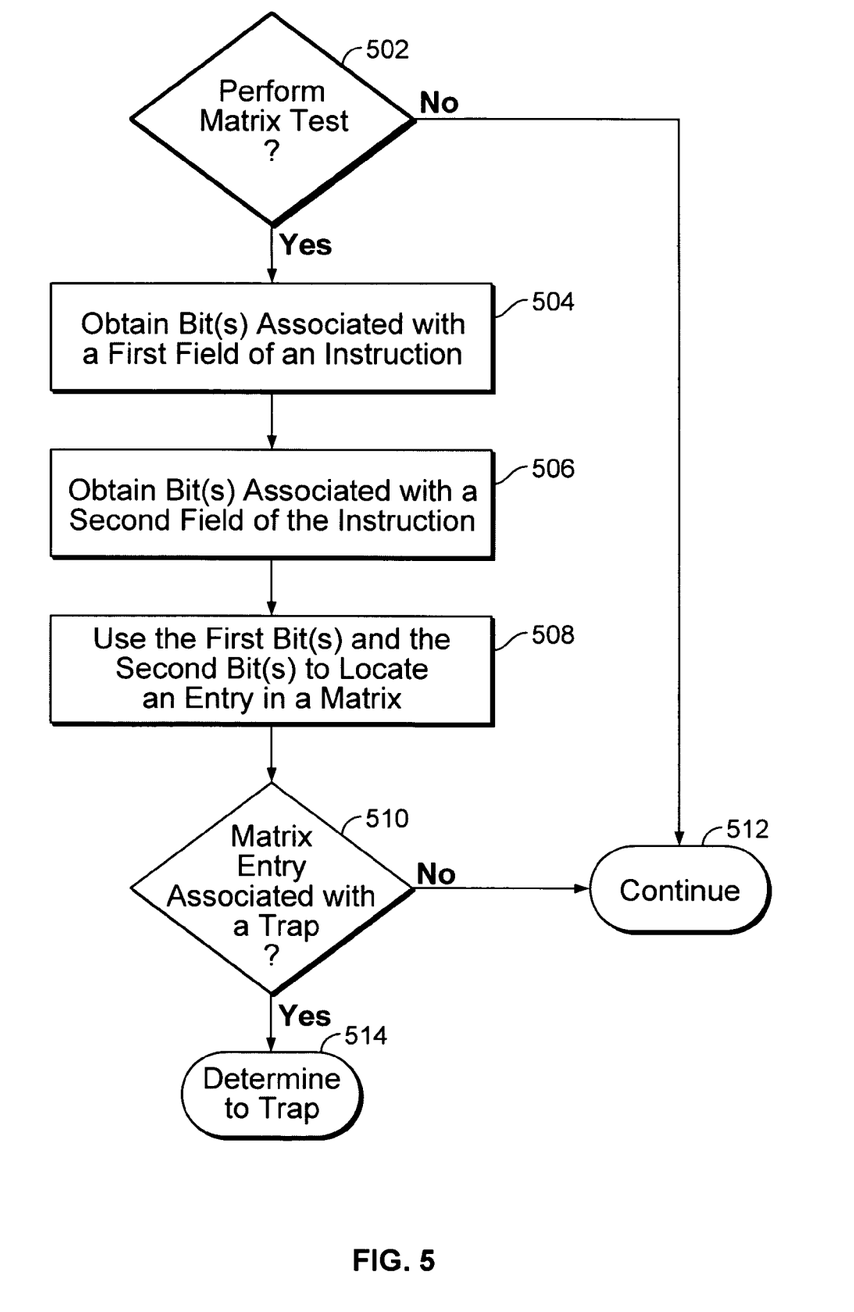
FIG. 5 is a flow chart illustrating an embodiment of a process for performing a matrix test.

FIG. 5 is a flow chart illustrating an embodiment of a process for performing a matrix test. In some embodiments, the process of FIG. 5 is included in 302 of FIG. 3. In some embodiments, the process of FIG. 5 is performed when executing instruction 100 of FIG. 1. At 502, it is determined whether the matrix test should be performed. The determination of 502 is configurable, predetermined, and/or dynamically configured. For example, the determination is predetermined by an opcode of an associated processor instruction and/or configured by data of an associated instruction. Examples of the configuration data include one or more of the following: an indication of a user level processing, one or more configuration bits of an instruction, a system configuration data, a processor configuration data, a program configuration data, and a dynamically updated data. At 502, if it is determined to not perform the matrix test, at 512, continue determination is reached. In some embodiments, continue determination of 512 is associated with determining not to trap at 304 of FIG. 3. In some embodiments, continue determination of 512 is associated with the end of the matrix test in the example of FIG. 5 and, if applicable, continuation or beginning of another process. At 502, if it is determined to perform the matrix test, at 504, one or more bits associated with a first field of an instruction are obtained. At 506, one or more bits associated with a second field of the instruction are obtained. In some embodiments, the first field is associated with an address, and the second field is associated with an address. In some embodiments, the bit(s) obtained are the bit(s) of the address type portion of an address in a format associated with address 200 of FIG. 2. In various embodiments, the bit(s) of the first and second fields are associated with a garbage collection generation. For example, the bit(s) are used to determine if an address associated with the field belongs to a group of objects designated as a new generation or a group of objects designated as an old generation. In various embodiments, the bit(s) of the first and second fields are associated with stack escape detection. For example, the bit(s) are used to determine if an address associated with the field belongs to a group of objects allocated on a stack or a group of objects allocated in a heap. At 508, the obtained bit(s) of the first field and the obtained bit(s) of the second field are used to locate an entry in a matrix. In some embodiments, one of the obtained bit(s) are at least in part used to determine a matrix column value, and the other obtained bit(s) are at least in part used to determine a matrix row value. The entry in the matrix is the entry with the determined column value and the determined row value. In various embodiments, the matrix is associated with garbage collection. The matrix entry is associated with a trap determination. In some embodiments, the first field is associated with a value being stored to a location associated with the second field, and the matrix used to determine if the value being stored is escaping from one type of managed memory to another type of managed memory. Managed memory type, in some embodiments, includes garbage collection generation, and/or heap, and/or stack. For example, managed memory type may include new generation memory, and/or old generation memory, and/or stack allocated memory, and/or raw pointer memory. Managed memory types, in some embodiments, may overlap in address space. For example, a memory location may be referred to using multiple managed memory types. At 510, if the located matrix entry is not associated with a trap, at 512, continue determination is reached. In some embodiments, continue of 512 is associated with determining not to trap at 304 of FIG. 3. In some embodiments, continue 512 is associated with the end of the matrix test in the example shown in FIG. 5 and, if applicable, continuation or beginning of another process. If at 510 the located matrix entry is associated with a trap, at 514, a trap determination is reached. In some embodiments, the trap of 514 is associated with 304 of FIG. 3. In various embodiments, the trap of 514 is associated with one or more trap handing processes. In some embodiments, the process of FIG. 5 includes a null value check. If at least one field of the instruction includes a null value, continue determination of 512 is reached.

Efficient memory management is important for efficient execution of computer programs. Many programming languages support memory management for heap memory. For example, some virtual machine implementations use a fast generational garbage collector that allocates objects from the heap, wherein the allocation streams through memory. Typically, streamed data flushes lines out of the cache and forces extra read operations and write operations. This leads to extra memory traffic and inefficient utilization of caches.

One way of reducing memory traffic is to use stack based allocation for memory management. In systems that support stack based allocation schemes, objects are allocated on the running program's stack instead of a shared heap. The memory is freed when the stack frame exits. Since manual stack allocation requires extensive programmer intervention and is error prone, stack based allocation is typically done automatically. Currently, successful stack based allocation requires accurate knowledge about the lifetime of objects. Such knowledge may be acquired using escape analysis.

Figure 6:
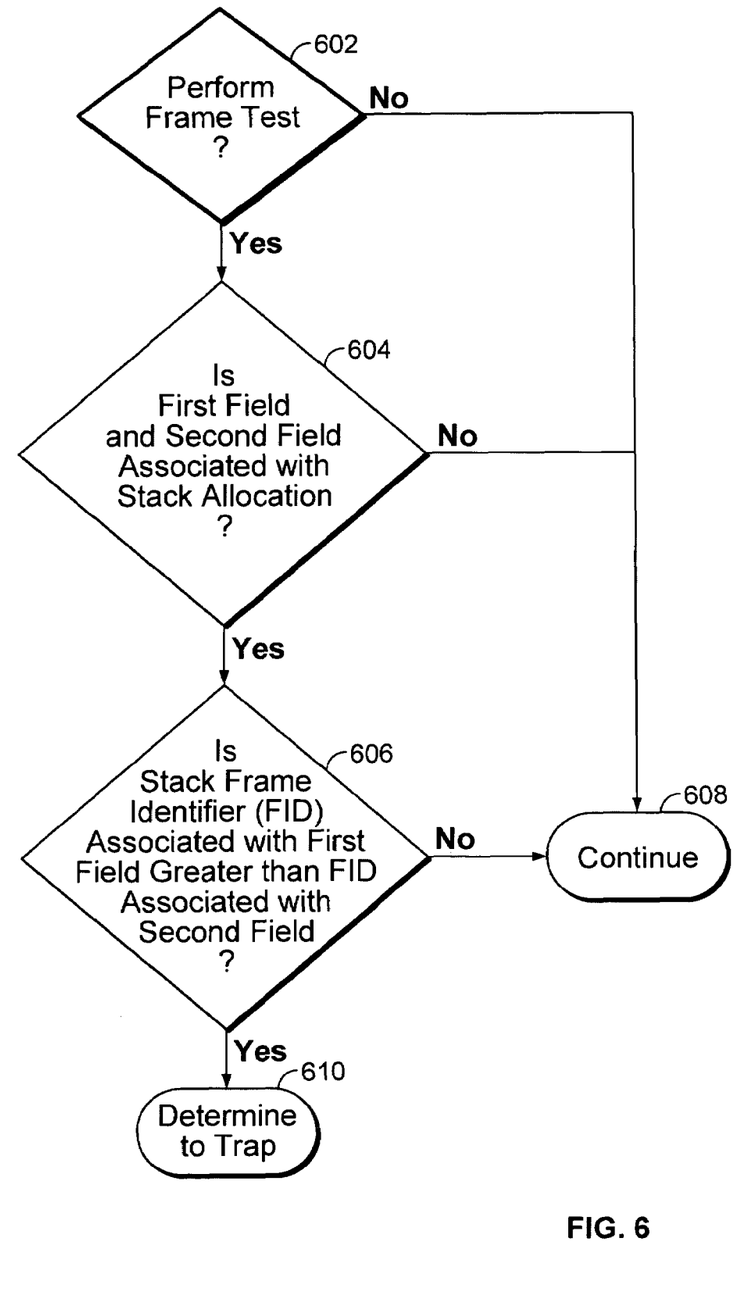
FIG. 6 is a flow chart illustrating an embodiment of a process for performing a frame test.

FIG. 6 is a flow chart illustrating an embodiment of a process for performing a frame test. In some embodiments, the process of FIG. 6 is included in 302 of FIG. 3. In some embodiments, the process of FIG. 6 is performed when executing instruction 100 of FIG. 1. At 602, it is determined whether the frame test should be performed. The determination of 602 is configurable, predetermined, and/or dynamically configured. For example, the determination is predetermined by an opcode of an associated processor instruction and/or configured by configuration data of an associated instruction. Examples of the configuration data include one or more of the following: an indication of a user level processing, one or more configuration bits of an instruction, a system configuration data, a processor configuration data, a program configuration data, and a dynamically updated data. At 602, if it is determined to not perform the frame test, at 608, continue determination is reached. In some embodiments, continue determination of 608 is associated with determining not to trap at 304 of FIG. 3. In some embodiments, continue determination of 608 is associated with the end of the frame test in the example shown in FIG. 6 and, if applicable, continuation or beginning of another process. At 602, if it is determined to perform the frame test, at 604, the process continues to 604. If at 604 a first field of an instruction and a second field of the instruction are not associated with stack allocation, at 608, continue determination is reached. In some embodiments, determining if a field of the instruction is associated with stack allocation includes using one or more bits of an address associated with the field. For example, the address associated with field included an address type portion, such as 202 of FIG. 2. At 604, if a first field of an instruction and a second field of the instruction are both associated with stack allocation, the process continues to 606. At 606, if it is determined a stack frame identifier associated with the first field is not greater than a stack frame identifier associated with the second field, at 608, continue determination is reached. In some embodiments, the stack frame identifier is associated with a stack depth. In some embodiments the greater than comparison of 606 is associated with detecting stack frame escapes. For example, the frame test includes detecting if an object reference associated with the first field being copied to a location associated with the second field is escaping to a deeper (older) stack frame than the stack frame of the object reference. If at 606 it is determined a stack frame identifier associated with the first field is greater than a stack frame identifier associated with the second field, at 610 a trap determination is reached. In some embodiments, the trap of 610 is associated with 304 of FIG. 3. In various embodiments, the trap of 610 is associated with one or more trap handing processes. In some embodiments, the process of FIG. 6 includes a null value check. If at least one field of the instruction includes a null value, continue determination of 608 is reached.

Figure 7:
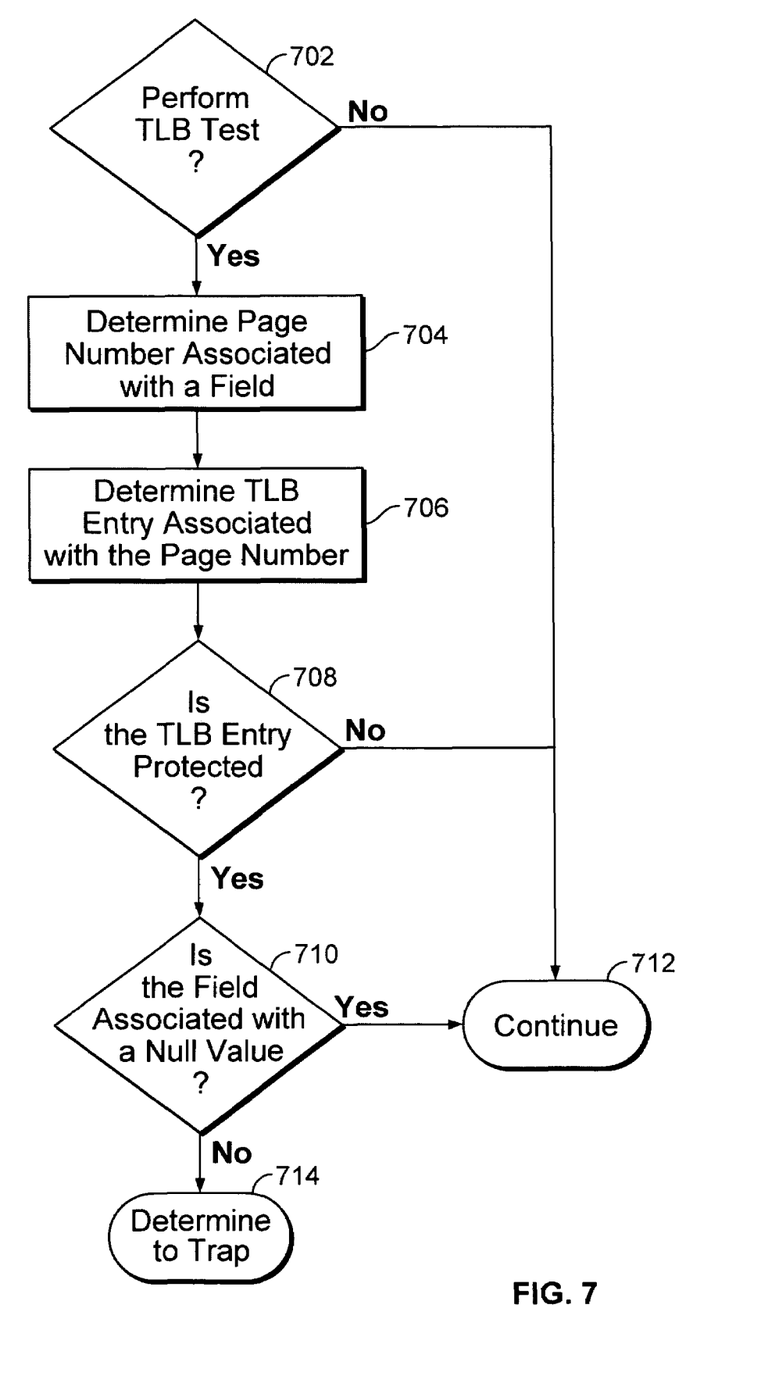
FIG. 7 is a flow chart illustrating an embodiment of a process for performing a TLB test.

FIG. 7 is a flow chart illustrating an embodiment of a process for performing a TLB test. In some embodiments, the process of FIG. 7 is included in 302 of FIG. 3. In some embodiments, the process of FIG. 7 is performed when executing instruction 100 of FIG. 1. At 702, it is determined whether the TLB test should be performed. The determination of 702 is configurable, predetermined, and/or dynamically configured. For example, the determination is predetermined by an opcode of an associated processor instruction and/or configured by configuration data of an associated instruction. Examples of the configuration data include one or more of the following: an indication of a user level processing, one or more configuration bits of an instruction, a system configuration data, a processor configuration data, a program configuration data, and a dynamically updated data. At 702, if it is determined to not perform the TLB test, at 712, continue determination is reached. In some embodiments, continue determination of 712 is associated with determining not to trap at 304 of FIG. 3. In some embodiments, continue determination of 712 is associated with the end of the TLB test in the example shown in FIG. 7 and, if applicable, continuation or beginning of another process. If at 702 it is determined to perform the TLB test, at 704, a page number associated with a field of an instruction is determined. The field includes an address value. In some embodiments, the process of FIG. 7 does not include accessing memory referenced by the address value. In various embodiments, the page number includes a memory page number. In various embodiments, the page number is derived from the most significant bits of the location reference portion of an address in a format associated with address 200 of FIG. 2. At 706, a TLB (Translation Look-aside Buffer) entry associated with the number is determined. At 708, if the TLB entry is not protected, at 712, continue determination is reached. In some embodiments, the protection of 708 is associated with garbage collection. A protected entry is associated with memory location undergoing garbage collection. If at 708 the TLB entry is protected, the process continues to 710. At 710, if the field is not associated with a null value, at 712, continue determination is reached. In some embodiments a null value includes a zero value portion and/or consists of only zero value bits. At 710, if the field is associated with a null value, at 714, a trap determination is reached. In various embodiments, the null check is performed before 704. The null check, in some embodiments, is optional and/or not performed. In some embodiments, the trap of 714 is associated with 304 of FIG. 3. In various embodiments, the trap of 714 is associated with one or more trap handing processes. Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   fetching an instruction that comprises:
      a first set of one or more bits identifying the instruction; and
      a second set of one or more bits associated with a first address value;
   executing the instruction to determine whether to perform a trap, wherein executing the instruction includes selecting from a plurality of tests at least one test for determining whether to perform a trap and carrying out the at least one test;
   wherein:
      the second set of one or more bits is used in the determination of whether to perform the trap;
      the determination does not include performing a memory access that uses the first address value to determine a memory location of the memory access;
      the selection of the at least one test is based at least in part on a configuration option; and
      the plurality of tests includes:
         a marking test based at least in part on a group of one or more marker bits included in the first address value; and
         a matrix test that determines whether a data value being stored as pointed to by the first address value is escaping from one of a plurality of managed memory types to another one of the plurality of managed memory types and generates a trap in the event that the data value is determined to be escaping from one of the plurality of managed memory types to another one of the plurality of managed memory types, wherein:
            the matrix test is based on a matrix associated with garbage collection and a matrix entry located using at least some of the first set of one or more bits and at least some of the second set of one or more bits; and
            the plurality of managed memory types include garbage collection generation, heap, and stack.

2. A method as recited in claim 1, wherein the instruction is associated with garbage collection.

3. A method as recited in claim 1, wherein the second set of bits includes one or more of the following: an operand of the instruction, the first address value, a value related to a memory location containing the first address value, an identifier associated with a register containing the first address value, and an identifier associated with a register containing a value related to a memory location containing the first address value.

4. A method as recited in claim 1, wherein before determining whether to perform the trap, the first address value is read from a memory location associated with a second address value associated with a third group of one or more bits included in the instruction.

5. A method as recited in claim 1, wherein in the event it is determined to not perform the trap, the first address value is stored to a memory location associated with a second address value associated with a third group of one or more bits included in the instruction.

6. A method as recited in claim 1, wherein the first address value includes one or more bits specifying one or more of the following: a marker portion, an address type portion, a frame ID portion, and a location reference portion.

7. A method as recited in claim 1, wherein performing the trap includes performing one or more of the following: redirecting execution of a program, executing a trap handler, modifying a program counter (PC) value, and logging the trap.

8. A method as recited in claim 1, wherein the group of one or more marker bits is compared with an expected marker value.

9. A method as recited in claim 8, wherein the expected marker value is preconfigured, configurable, or dependent upon the first address value, the second set of one or more bits, the instruction, or configuration data.

10. A method as recited in claim 1, wherein an object is associated with the first address value; and the group of one or more marker bits indicates one or more of following: whether the first address value has been processed, whether a garbage collector has traversed the first address value, whether the object has been processed, whether the object has been flagged, whether the object has been marked, whether a garbage collector has traversed the object, whether a garbage collector has traversed references included in the object, and whether the object is live or dead.

11. A method as recited in claim 1, wherein the matrix entry is located by using one or more bits of a second address value associated with a third group of one or more bits included in the instruction.

12. A method as recited in claim 11, wherein the memory location is associated with the second address value.

13. A method as recited in claim 1, wherein when determining whether to perform the trap, a translation look-aside buffer (TLB) entry is used to determine whether the TLB entry is protected.

14. A method as recited in claim 13, wherein a protected TLB entry is associated with a memory location undergoing garbage collection.

15. A method as recited in claim 1, wherein the determination is based at least in part on whether the first address value includes a null value before the determination is based at least in part one or more of the following: the group of one or more marker bits included in the first address value, a matrix entry located at least in part by using the one or more bits of the first address value, a translation look-aside buffer (TLB) entry associated with the first address value, and whether the first address value is associated with stack allocated memory.

16. A method as recited in claim 1, wherein the plurality of tests further includes a frame test that uses the second set of one or more bits to determine whether to perform the trap, and the frame test is based at least in part on determining whether the first address value is associated with stack allocated memory in which one or more objects are allocated.

17. A method as recited in claim 16, wherein the frame test is based at least in part on a stack frame identifier included in the first address value.

18. A method as recited in claim 16, wherein the instruction further comprises a third set of one or more bits associated with a second address value used in the determination; and the frame test is based at least in part on determining whether the second address value is associated with stack allocated memory.

19. A method as recited in claim 18, wherein the frame test is based at least in part on comparing a first stack frame identifier included in the first address value with a second frame identifier included in the second address value.

20. A method as recited in claim 19, wherein the comparison includes determining whether one frame identifier is of a deeper stack frame than the stack frame of another frame identifier.

21. A method as recited in claim 1, wherein the plurality of tests further includes: translation look-aside buffer (TLB) test that is based at least in part on a TLB entry associated with the first address value, a frame test that determines whether the first address value is associated with stack allocated memory, and a null check that determines whether the first address value includes a null value.

22. A method as recited in claim 21, wherein one or more bits of the instruction specify a configuration associated with the instruction; and the configuration includes one or more of the following: an instruction format specification, an instruction field format specification, configuration associated with an operation of the instruction, and specification of the at least one test used in making the determination of whether to perform the trap.

23. A method as recited in claim 21, wherein the at least one test used in making the determination of whether to perform the trap is specified at least in part by one or more of the following: the first set of bits identifying the instruction, an indication of a user level processing, system configuration data, processor configuration data, program configuration data, dynamically updated data, and configuration data associated with the instruction.

24. A computer system comprising:
   a processor configured to:
      fetch an instruction; and
      execute the instruction to determine whether to perform a trap operation, wherein executing the instruction includes selecting from a plurality of tests at least one test for determining whether to perform a trap and performing the at least one test; and
   a memory coupled with the processor, wherein the memory is configured to provide the processor with the instruction, wherein the instruction includes:
      a first set of one or more bits identifying the instruction; and
      a second set of one or more bits associated with a first address value;
   wherein:
      the second set of one or more bits is used in the determination of whether to perform the trap;
      the determination does not include performing a memory access that uses the first address value to determine a memory location of the memory access;
      the selection of the at least one test is based at least in part on a configuration option; and
      the plurality of tests includes:

a marking test in which a group of one or more marker bits included in the first address value is used to determine whether to perform a trap; and a matrix test that determines whether a data value being stored as pointed to by the first address value is escaping from one type of managed memory to another type of managed memory and generates a trap in the event that the data value is determined to be escaping from one type of managed memory to another type of managed memory, wherein:

the matrix test is based on a matrix associated with garbage collection and a matrix entry located using at least some of the first set of one or more bits and at least some of the second set of one or more bits; and the managed memory types include garbage collection generation, heap, and stack.

25. A computer system as recited in claim 24, wherein the second set of bits includes one or more of the following: an operand of the instruction, the first address value, a value related to a memory location containing the first address value, an identifier associated with a register containing the first address value, and an identifier associated with a register containing a value related to a memory location containing the first address value.

26. A computer system as recited in claim 24, wherein the at least one test used in making the determination of whether to perform the trap is specified at least in part by one or more of the following: the first set of bits identifying the instruction, an indication of a user level processing, system configuration data, processor configuration data, program configuration data, dynamically updated data, and configuration data associated with the instruction.

27. A computer system as recited in claim 24, wherein the plurality of tests further includes a frame test based at least in part on determining whether the first address value is associated with stack allocated memory in which one or more objects are allocated.

28. A computer system as recited in claim 27, wherein the frame test is based at least in part on a stack frame identifier included in the first address value.

29. A computer system as recited in claim 27, wherein the instruction further comprises a third set of one or more bits associated with a second address value used in the determination; and the frame test is based at least in part on determining whether the second address value is associated with stack allocated memory.

30. A computer system as recited in claim 24, wherein the plurality of tests further includes: a translation look-aside buffer (TLB) test that is based at least in part on a TLB entry associated with the first address value, a frame test that determines whether the first address value is associated with stack allocated memory, and a null check that determines whether the first address value includes a null value.

\* \* \* \* \*